United States Patent
Huang et al.

(10) Patent No.: US 6,344,979 B1
(45) Date of Patent: Feb. 5, 2002

(54) LLC SERIES RESONANT DC-TO-DC CONVERTER

(75) Inventors: Guisong Huang; Alpha J. Zhang; Yilei Gu, all of Shanghai (CN)

(73) Assignee: Delta Electronics, Inc.

( * ) Notice: Subject to any disclaimer, the term of this patent is extended or adjusted under 35 U.S.C. 154(b) by 0 days.

(21) Appl. No.: 09/780,128

(22) Filed: Feb. 9, 2001

(51) Int. Cl.$^7$ .............................................. H02M 3/335
(52) U.S. Cl. ........................... 363/16; 363/17; 363/131; 363/132
(58) Field of Search .............................. 363/15, 16, 17, 363/39, 40, 131, 132

(56) References Cited

U.S. PATENT DOCUMENTS

| | | | |
|---|---|---|---|
| 4,785,387 A | * 11/1988 | Lee et al. | 363/131 |
| 4,814,962 A | * 3/1989 | Magalhaes et al. | 363/17 |
| 4,876,635 A | * 10/1989 | Park et al. | 363/132 |
| 5,388,040 A | * 2/1995 | Hall | 363/16 |
| 5,438,498 A | * 8/1995 | Ingemi | 363/132 |
| 5,684,678 A | * 11/1997 | Barrett | 363/17 |
| 5,777,859 A | * 7/1998 | Raets | 363/133 |
| 5,781,418 A | * 7/1998 | Chang et al. | 363/16 |
| 5,805,432 A | * 9/1998 | Zaitsu et al. | 363/39 |
| 5,986,895 A | * 11/1999 | Stewart et al. | 363/16 |
| 6,137,234 A | * 10/2000 | Willaert et al. | 363/37 |

* cited by examiner

*Primary Examiner*—Jeffrey Sterrett
(74) *Attorney, Agent, or Firm*—Bo-In Lin (57) ABSTRACT

The present invention discloses a DC-to-DC converter. The DC-to-DC converter includes a square wave generator for generating a sequence of output voltages having a waveform of square wave. The DC-to-DC converter further includes a resonant tank connected to the square wave generator comprising a series capacitor connected to a series inductor and a parallel inductor. The DC-to-DC converter further includes a transformer having a primary side connected in series with the series inductor and connected in parallel to the parallel inductor. The transformer further includes a secondary side for connecting to a rectifying circuit for providing a rectified DC voltage to an output load circuit. The series capacitor functioning with the series inductor to provide a first characteristic resonant frequency represented by $f_s$, and the series capacitor functioning with the series inductor and the parallel inductor to provide a second characteristic resonant frequency represented by $f_m$ wherein $f_s > f_m$. The converter runs at variable frequency switching to perform output regulation. The converter features high conversion efficiency at high input operation by switching at frequency between the first and second characteristic resonant frequency. In a preferred embodiment, the parallel inductor is integrated to transformer as primary magnetizing inductor and in further the series inductor may also be integrated into transformer.

14 Claims, 8 Drawing Sheets

LLC Series Resonant DC-to-DC Converter

Fig. 1 Prior Art
Series Resonant DC-to-DC Converter

Fig. 2 Prior Art
Parallel Resonant DC-to-DC Converter

Fig. 3 Prior Art
LCC Parallel Resonant DC-to-DC Converter

Fig.4 LLC Series Resonant DC-to-DC Converter

Fig. 5 Equivalent Circuit of LLC Resonant DC-to-DC Converter

Fig.6 Waveforms of LLC Resonant DC-to-DC Converter at $f = f_s$

Fig.7 Waveforms of LLC Resonant DC-to-DC Converter at $f_m < f < f_s$

Fig.8 Waveforms of LLC Resonant DC-to-DC Converter at $f > f_s$

Fig.9 Derivative circuit:
Resonant inductance integrated into transformer

Fig.10 Application Example 1:
Full Bridge Rectifier in the Output Side

Fig.11 Application Example 2:
Full Bridge Inverter in the Input Side

Fig.12 Application Example 3:
Two Half-Bridges Connected in Series

US 6,344,979 B1

LLC SERIES RESONANT DC-TO-DC CONVERTER

BACKGROUND OF THE INVENTION

1. Field of the Invention

This invention relates generally to the power supply systems that include DC-to-DC conversion operations. More particularly, this invention relates to an improved circuit design and configuration to achieve better power conversion efficiency, broader operation ranges and improved soft switch performance.

2. Description of the Prior Art

Conventional art of design and manufacture of the resonant DC-to-DC converter are confronted with the limitations of low power conversion efficiency and narrow operation ranges. Specifically, in a conventional pulse-width modulated (PWM) converter, for the purpose of achieving a hold-up time under the circumstance of a drop of input voltage, the duty cycle and other operational parameters must be compromised to achieve the hold-up requirement under a low input voltage condition. The power conversion efficiency is sacrificed for normal operation with input voltage within its normal range. This difficulty of not able to optimize the circuit design for properly selecting the parameters of resonant network most suitable to a normal input voltage range leads to wastes of power. Additionally, as will be further discussed below, conventional resonant converter has limited ranges of input and output voltages and that often limit the application flexibility of a DC-to-DC converter when implemented with a resonant circuit.

Figure 1:
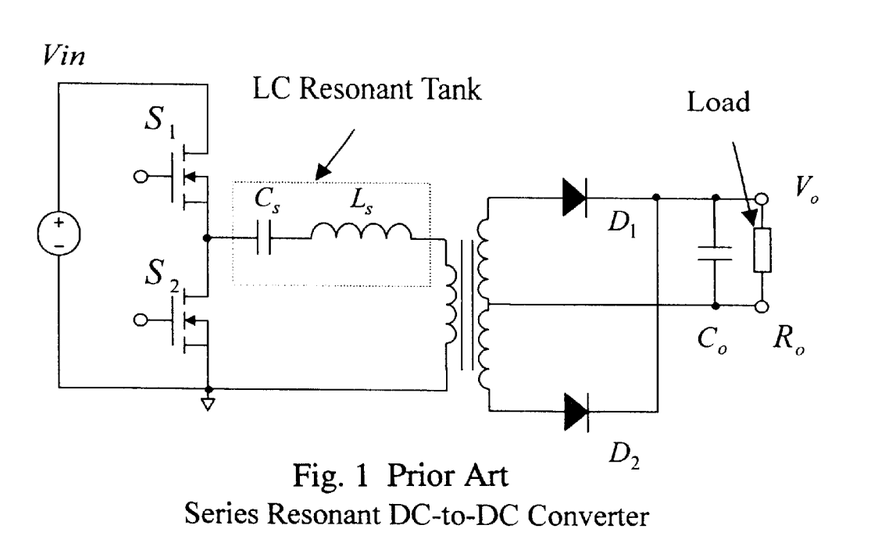
FIG. 1 is a circuit diagram for showing a conventional Series Resonant DC-to-DC Converter.
Figure 2:
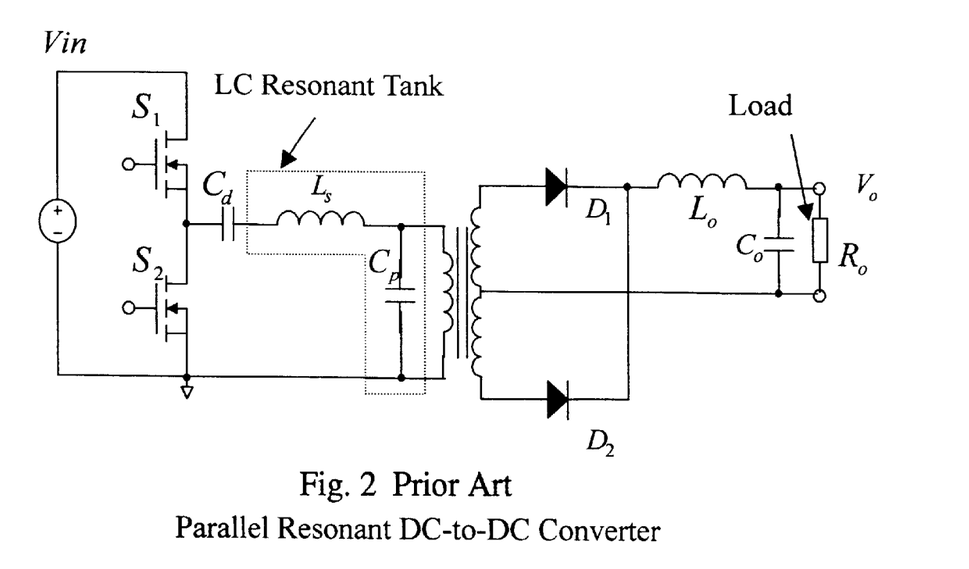
FIG. 2 is a circuit diagram for showing a conventional Parallel Resonant DC-to-DC Converter.

There are two types of resonant converters, namely the series resonant converter and parallel resonant converter. Implemented with a full-bridge or a half-bridge structure, an inductance-capacitance (LC) resonant tank was used to create conditions for lossless turn-on or turn-off of the semiconductor switches. FIG. 1 shows a series resonant converter implemented with a half-bridge structure with the load connected in series with the resonant tank. In contrast, FIG. 2 shows a parallel resonator converter implemented with a half-bridge structure with the load arranged in parallel with the resonant capacitor. Generally, when switching frequency is above the resonant frequency, the switches turn on at zero voltage condition, thus eliminating the turn-on switching losses. In order to regulate the output voltage, the series resonant converter and parallel resonant converter apply a variable switching frequency control method. For a series resonant converter, the major disadvantage is that it requires a relatively large frequency range to regulate the output for a wide load range and the output could not be well regulated under no-load condition. With a parallel connection of the resonant tank and the load, a parallel resonant converter can regulate the output voltage under no-load condition. However, the circulation energy is significantly high. As a result, the power conversion efficiency decreases rapidly as the load is reduced. Also, the performance of the series resonant converter and parallel resonant converter are both limited by the relatively narrow ranges of the input voltage.

Figure 3:
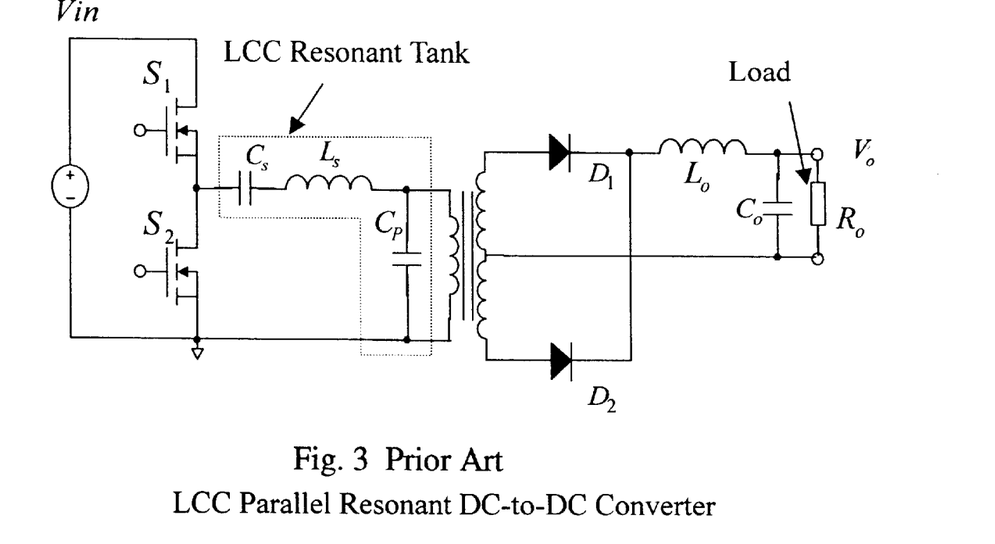
FIG. 3 is a circuit diagram for showing a conventional LCC Series-Parallel Resonant DC-to-DC Converter.

FIG. 3 shows the circuit of LCC resonant converter. LCC resonant converter derived from parallel resonant converter by adding a series resonant capacitor Cs. Compared to parallel resonant converter, the circulation energy of LCC resonant converter is reduced and the performance of voltage regulation is improved. However, the LCC resonant converter is still limited by the relatively narrow range of input voltages.

Therefore, an improved resonant converter for broadening the range of the input voltages and to improve the conversion efficiency is required to resolve these difficulties. Specifically, a new circuit architecture is required that would preserve the soft switching characteristics while allow the circuit design optimization based on the normal operation conditions without being limited by the holdup requirement during a drop of the input voltage.

SUMMARY OF THE PRESENT INVENTION

It is therefore an object of the present invention to provide a novel configuration and method of design and manufacturing of a DC-to-DC converter for improving the conversion efficiency while preserving the soft switching characteristic and allowing the circuit design to be optimized for a normal operation condition. The new and improved DC-to-DC converter can therefore enables those of ordinary skill in the art to overcome the difficulties of the prior art.

Specifically, it is an object of the present invention to provide a configuration and method by providing a LLC resonant network to a DC-to-DC converter to have dual characteristic resonant frequencies such that the output voltage can be controlled by adjusting the switching period of a pair of input switches. The range of input and output voltages can be more flexibly adjusted based on these operational and control characteristics and the circuit design can be conveniently optimized based on a normal operation condition.

Briefly, in a preferred embodiment, the present invention discloses a DC-to-DC converter. The DC-to-DC converter includes a square wave generator for generating a sequence of output voltages having a waveform of square wave. The DC-to-DC converter further includes a resonant tank connected to the square wave generator comprising a series capacitor connected to a series inductor and a parallel inductor. The DC-to-DC converter further includes a transformer having a primary side connected in series with the series inductor and connected in parallel to the parallel inductor. The transformer further includes a secondary side for connecting to a rectifying circuit for providing a rectified DC voltage to an output load circuit. The series capacitor functioning with the series inductor to provide a first characteristic resonant frequency represented by $f_s$, and the series capacitor functioning with the series inductor and the parallel inductor to provide a second characteristic resonant frequency represented by $f_m$ wherein $f_s > f_m$. In a preferred embodiment, the first characteristic resonant frequency is $f_s = 1/(2\pi\sqrt{L_s C_s})$ and the second characteristic resonant frequency is $f_m = 1/(2\pi\sqrt{(L_s + L_m)C_s})$ wherein $C_s$ representing a capacitance of the series capacitor, $L_s$ representing an inductance of the series inductor and $L_m$ representing an inductance of the parallel inductor.

These and other objects and advantages of the present invention will no doubt become obvious to those of ordinary skill in the art after having read the following detailed description of the preferred embodiment that is illustrated in the various drawing figures.

DETAILED DESCRIPTION OF THE PREFERRED EMBODIMENT

Figure 4:
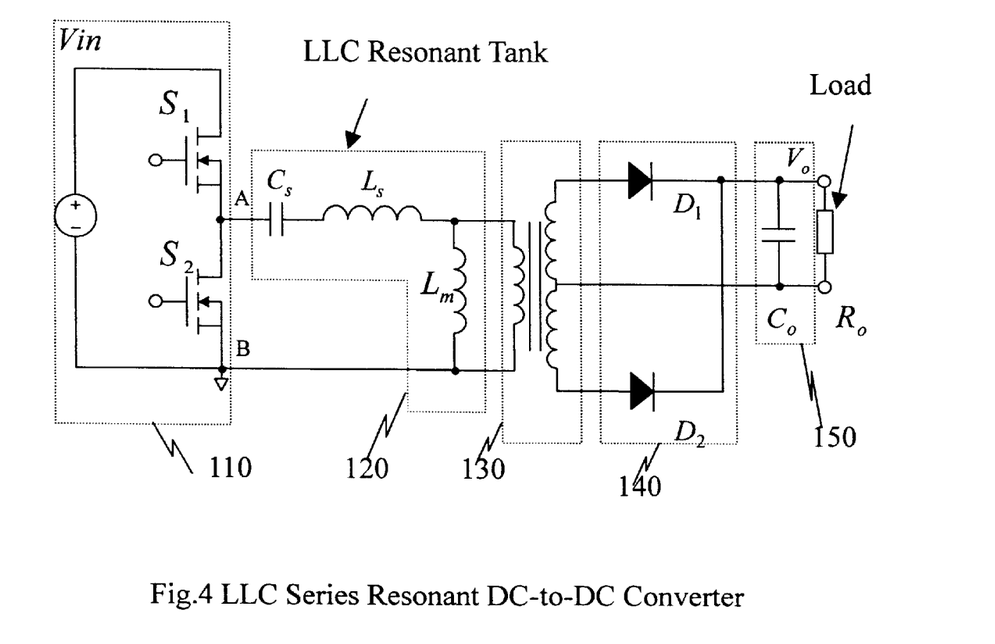
FIG. 4 is a circuit diagram of a LLC Series Resonant DC-to-DC converter of this invention.

FIG. 4 shows a circuit schematic of a LLC series resonant DC-to-DC converter of this invention. This new resonant converter includes a square-waveform generator 110, an LLC resonant network 120, a high frequency transformer 130, a rectifying circuit 140 and an output filter 150. The square-waveform generator circuit 110 is a half bridge inverter and contains two switches (S1 and S2). Instead of a half bridge inverter, a full bridge inverter may also be used in place of half bridge. The LLC resonant network 120 is connected across two terminals, i.e., terminals A and B, of the second switch S2 to receiving signals of square waveform as the switches S1 and S2 alternately turns on and off. The LLC resonant tank 120 includes a series capacitor $C_s$ connected in series with a series inductor $L_s$. The LLC resonant tank 120 further includes a parallel inductor $L_m$ connected in parallel with the primary windings of the transformer 130. The series capacitor $C_s$ in the resonant network serves two functions. First, the series capacitor $C_s$ blocks the DC component of voltage $V_{AB}$ inputted as signals of square waveform to pass to the transformer 130. The series capacitor $C_s$ also forms a resonant circuit with the series inductor $L_s$ and the parallel inductor $L_m$. The series inductor Ls can be implemented as an external component as explicitly shown in FIG. 4, or as the leakage inductance of the transformer. Furthermore, the parallel inductor $L_m$ can also be implemented as an external inductor or as the magnetizing inductance of the transformer 130.

The high frequency transformer 130 formed with a primary winding coupled to a secondary winding provides matching and isolation for the output voltage of the converter. The rectifying circuit 140, which includes diodes D1 and D2, forms a center-tapped rectifier, and converts the resonant current into unidirectional current. A full bridge rectifier can also be used in place of the center-tapped one. The output filter 150 includes a capacitor $C_o$ filters out the high frequency ripple current and provides a ripple free constant output voltage $V_o$ across the output load.

Figure 5:
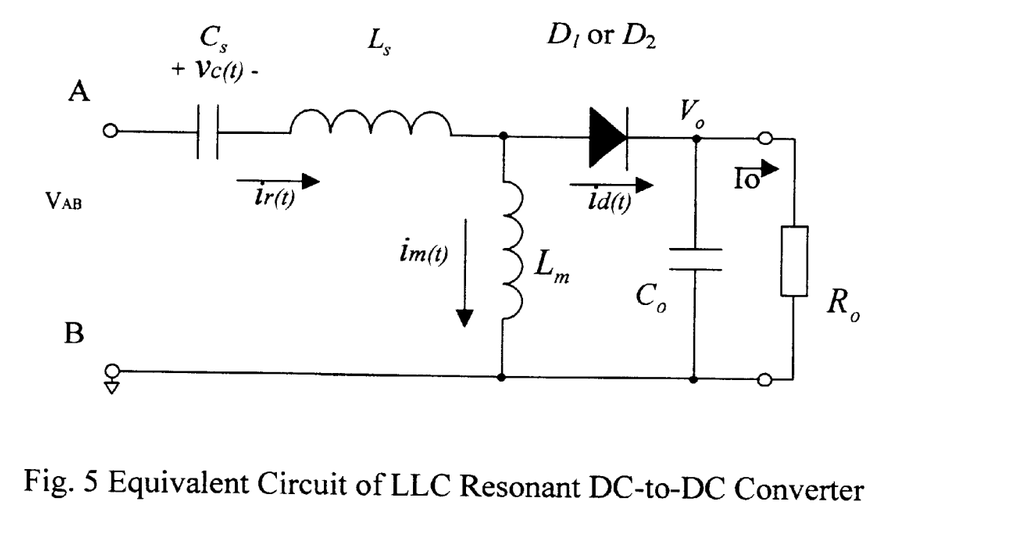
FIG. 5 shows an equivalent circuit of the LLC Resonant DC-to-DC converter of FIG. 4.

According to the present invention, the gate signals applied to switches S1 and S2 are complementary of each other. The duty cycle of either of these two complimentary signals is 50%. A variable operation frequency control is used for alternately switching on and off of these two switches to regulate the output voltage $V_o$. Referring to FIG. 5 as an equivalent circuit for describing the operational characteristics of the LLC resonant converter. Specifically, the resonant DC-to-DC converter as shown now implemented with the LLC resonant network has two characteristic frequency points as the first characteristic resonant frequency $f_s$ and the second characteristic resonant frequency $f_m$:

$$f_s = 1/(2\pi\sqrt{L_s C_s}) \tag{1}$$

$$f_m = 1/(2\pi\sqrt{(L_s+L_m)C_s}) \tag{2}$$

The operation principle of LLC resonant converter can be described by three cases:

(1) $f=f_s$

Figure 6:
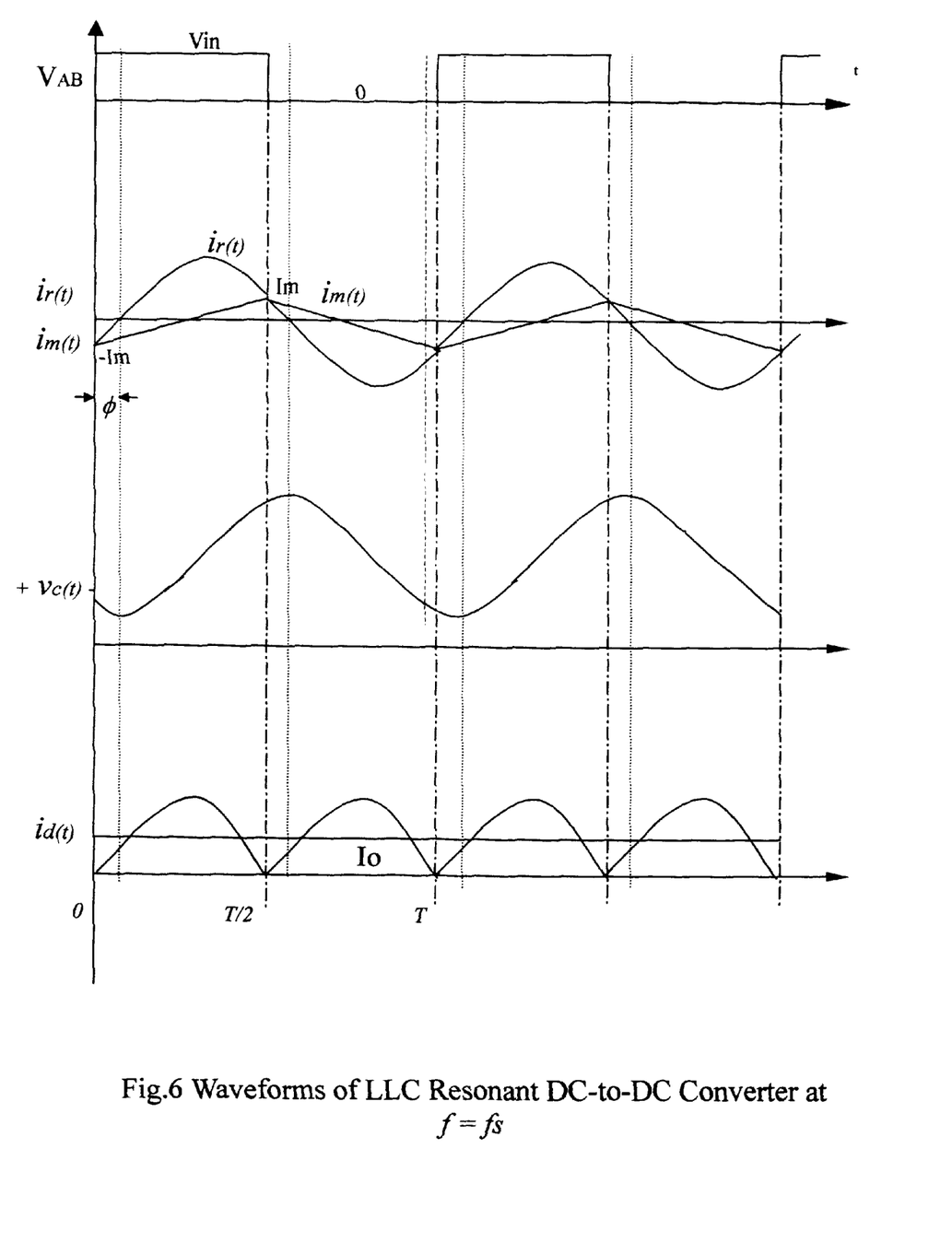
FIG. 6 shows the waveforms of LLC Resonant DC-to-DC Converter at $f=f_s$.

Referring to FIG. 6 for the operation waveforms of the LLC resonant converter when the switching frequency $f$ is identical to the series resonant frequency $f_s$. As the voltage $V_{AB}$ across terminals A and B are switching on and off between a ground voltage and an input voltage $V_{in}$ with a frequency of $f_s$, the current in the resonant tank $i_r(t)$ is shown as a sine waveform. The high frequency component of the voltage $v_c(t)$ across the series capacitor $C_s$ also has a pure sine waveform. The current $i_m(t)$ passing through the parallel inductor $L_m$ is substantially increasing and decreasing approximately as a linear function between a high and low voltage in synchronization with the on-off cycles of $V_{AB}$. The relationship between the input voltage $V_{in}$ and output voltage Vo can be expressed by:

$$V_o = \frac{V_{in}}{2n} \tag{3}$$

Wherein n is the transformer turns ratio, which is defined as a ratio of the turns of the primary winding to that of the secondary winding of the transformer 130.

(2) $f_m<f<f_s$

Figure 7:
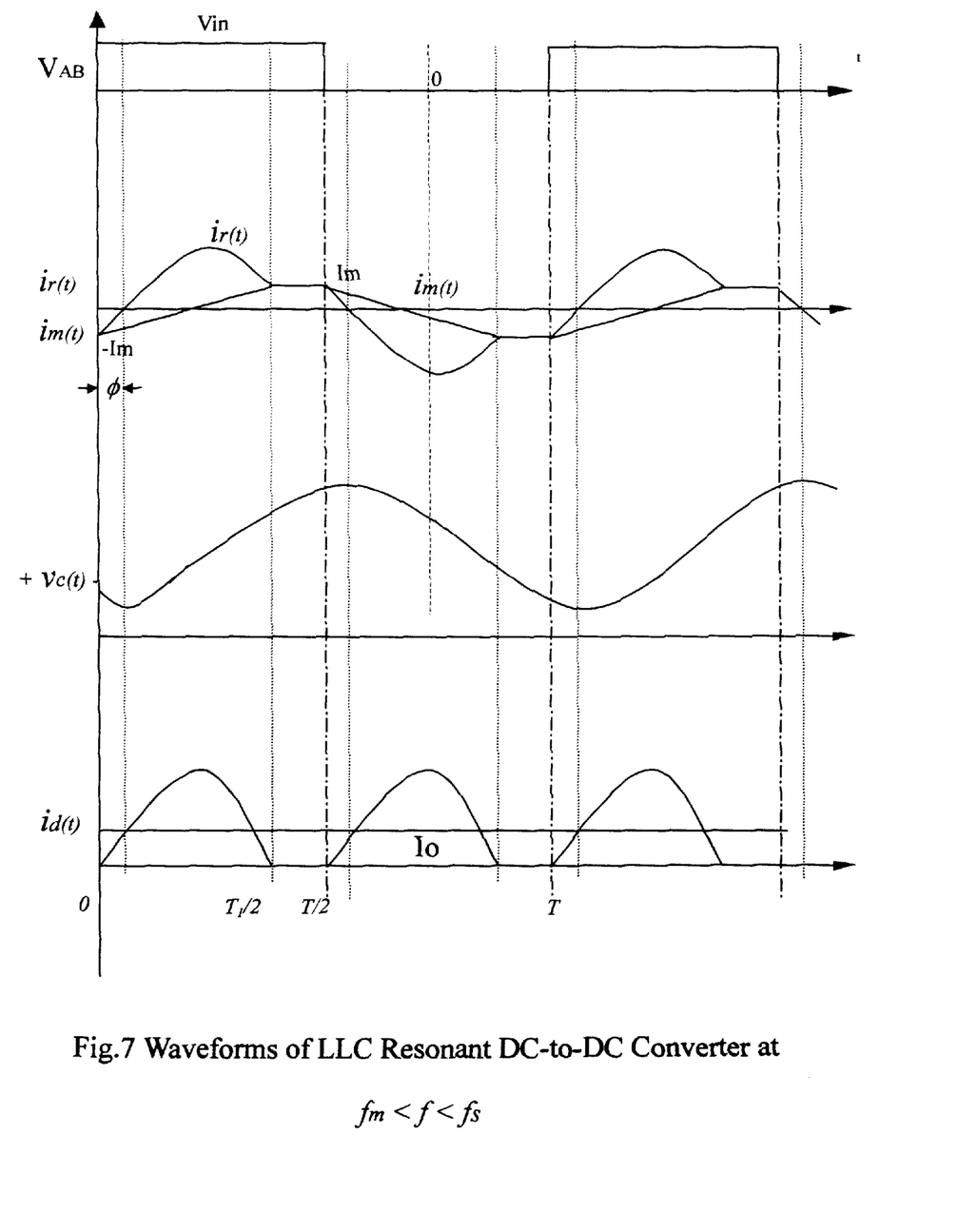
FIG. 7 shows the waveforms of LLC Resonant DC-to-DC Converter at $f_m<f<f_s$.

Referring to FIG. 7 for the operation waveforms of the LLC resonant converter when the switching frequency is between the frequencies of the two characteristic resonant frequency, i.e., $f_m<f<f_s$. When the voltage across the switch S2 is high with $V_{AB}=V_{in}$ and the resonant tank 120 is provided with an input dc voltage, a series resonance happened through $L_s$ and $C_s$ and a sine-wave current is fed to output side. At a point of time T1/2 that is a half-period of series resonance, the current $i_d(t)$ passing through the rectifier diodes decreases to zero. The rectifier at output side recovers naturally and the resonance is transferred to $C_s$ and $L_s+L_m$. In this operation mode, the resonant current continues to charge the resonant capacitor $C_s$. Because $L_m$ is much greater than $L_s$, the resonant current is almost constant in this interval.

When switch S1 is turned off and switch S2 is turned on, the voltage $V_{AB}$ drops to zero, the resonance between $L_s$, $L_m$ and $C_s$ is activated by the stored energy in the resonant capacitor $C_s$. The waveforms are substantially symmetrical with the first-half period. The relationship between input and output voltage can be expressed by:

$$V_o = \frac{V_{in}}{2n} + \frac{I_m}{4nC_s}(T-T_1) \tag{4}$$

Wherein $I_m$ is the peak value of magnetizing current $$I_m = \frac{nV_oT}{4L_m}, T_1$$

is the period of series resonance $$T_1 = \frac{1}{f_s}$$

and T is the period corresponding
to the switching frequency. Therefore, output voltage will be raised with increase of switching period T, and constant output voltage $V_o$ can be maintained at lower input voltage operation by increasing switching period of T according to Equation (4).

This is the typical and feature operation mode of LLC series resonant DC-to-DC converter of this invention. Due to relatively higher magnetizing current, primary switches operate under ZVS condition over whole range of input voltage and output load. And meanwhile, the secondary rectifiers operate under ZCS condition due to switching operation at lower than the first characteristic resonant frequency $f_s$.

(3) $f > f_s$.

Figure 8:
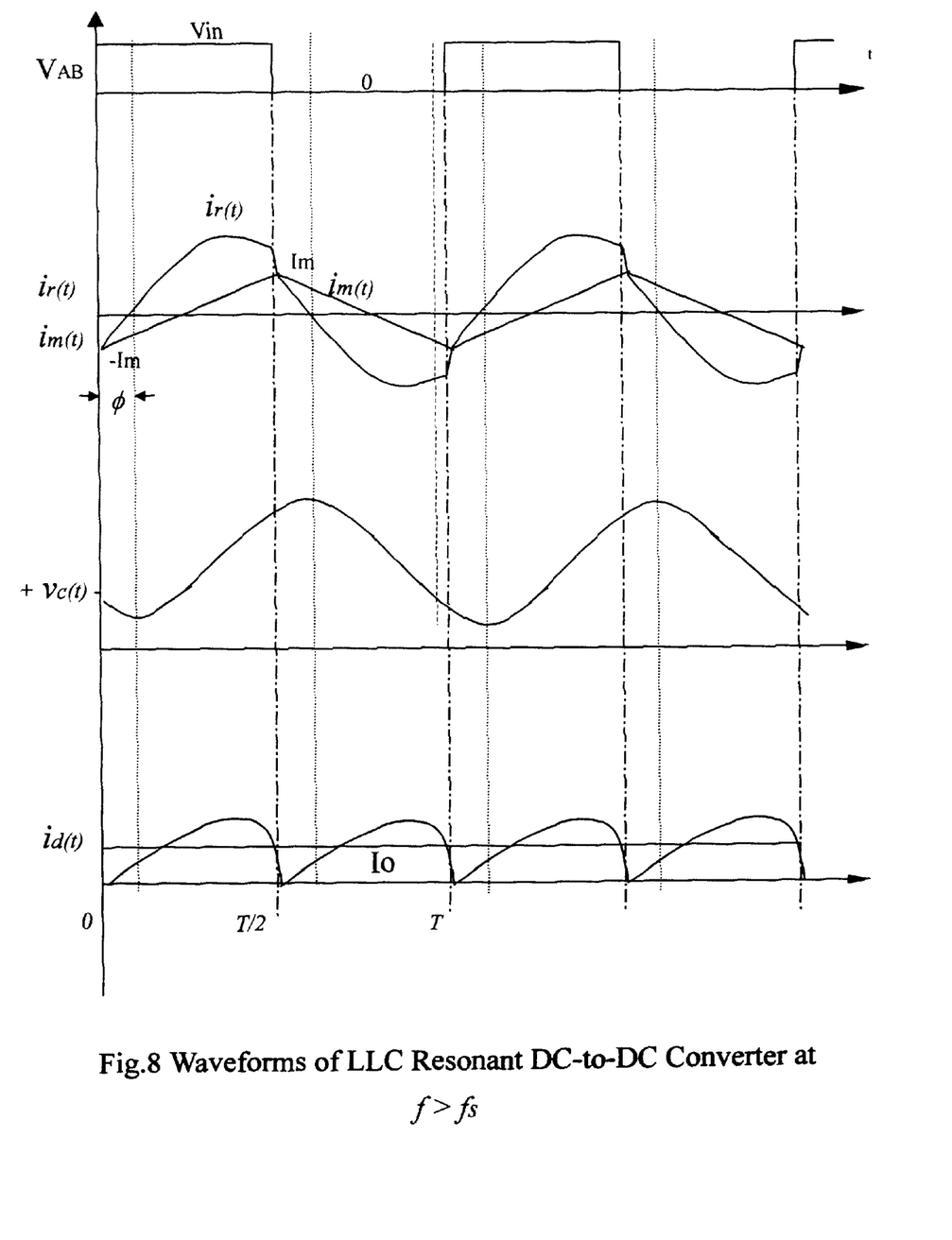
FIG. 8 shows the waveforms of LLC Resonant DC-to-DC Converter at $f>f_s$.

Referring to FIG. 8 for the operation waveforms of the LLC resonant converter when the switching frequency $f$ is greater than the first characteristic resonant frequency $f_s$, i.e., $f > f_s$, the operation of the LLC series resonant DC-to-DC converter of this invention will degenerate to be a conventional series resonant converter. There appears only a resonance between $L_s$ and $C_s$ when switch S1 and S2 is complementary turned on or off, no more resonance between $L_s$, $L_m$ and $C_s$.

From detailed description above, it can be seen that, for conventional resonant dc/dc converter, conversion efficiency can be optimized at low input operation with the converter switching at characteristic resonant frequency $f_s$, and the switching frequency will be higher at high input to regulate output voltage, which results lower conversion efficiency operation. For the LLC series resonant DC-to-DC Converter of this invention, lower frequency switching can be applied to the converter to regulate output voltage at low input operation, refer to output voltage regulation as equation (4), therefore, the conversion efficiency can be optimized as maximum at high input with the converter switching at characteristic resonant frequency $f_s$. Moreover, the LLC series resonant dc/dc converter also features much lower switching loss at high frequency operation due to zero-voltage switching for primary switches and zero-current switching for secondary rectifiers, therefore, much higher conversion efficiency can be achieved by the converter of this invention comparing to conventional resonant converters or PWM converters.

Figure 9:
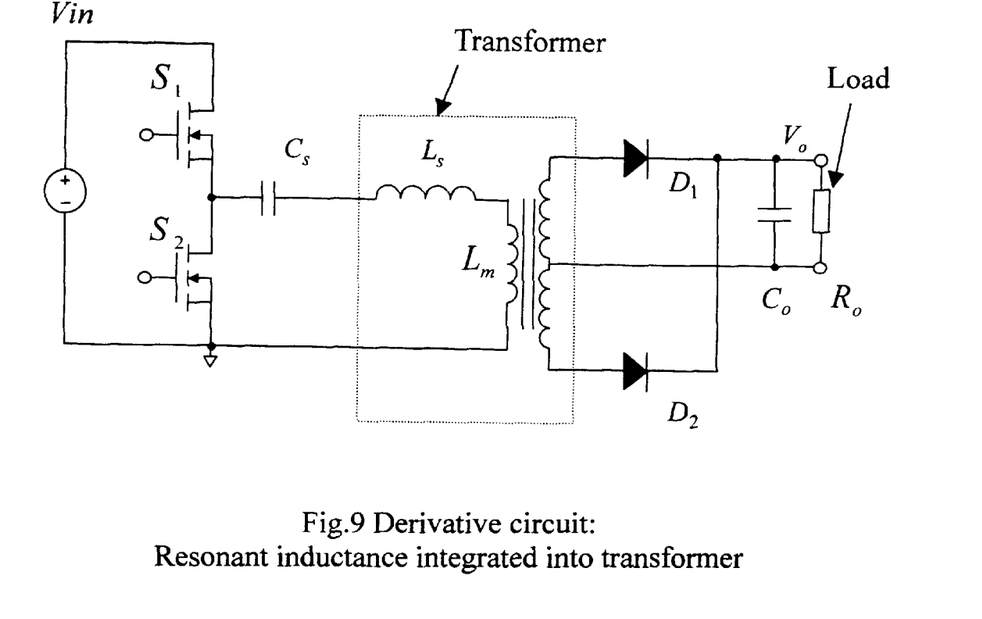
FIG. 9 is a derivative circuit: Resonant inductance integrated into the transformer.
Figure 10:
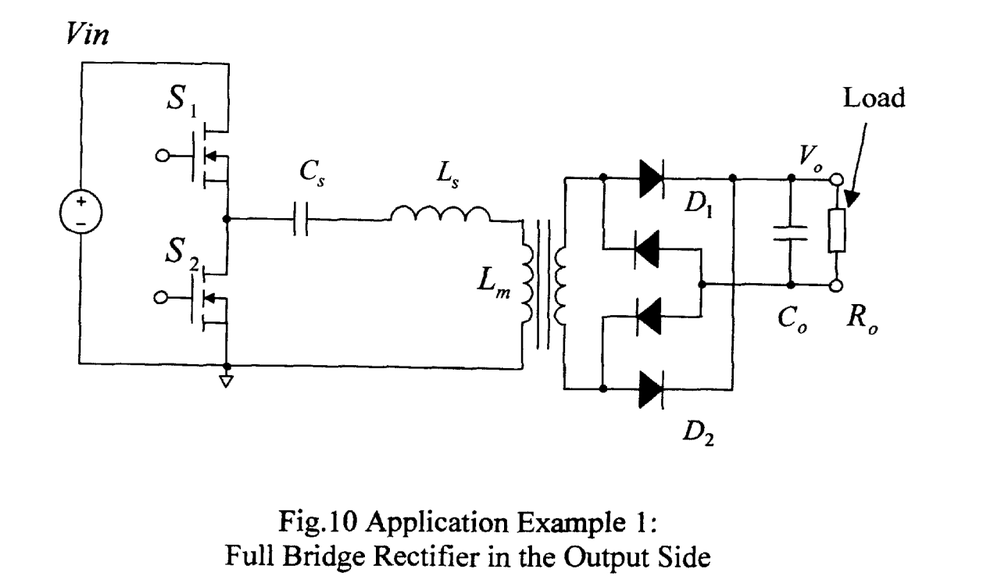
FIG. 10 is a circuit diagram for a converter of this invention with a Full Bridge Rectifier in the Output Side.
Figure 11:
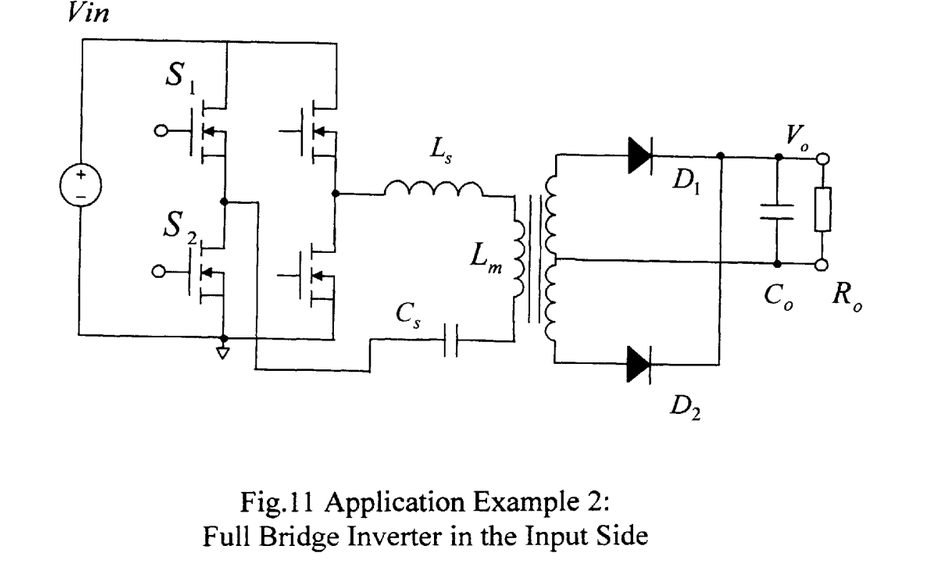
FIG. 11 is a circuit diagram for a converter of this invention with a Full Bridge Inverter in the Input Side.

The invention according to the configuration and functional characteristics as described in FIGS. 4 to FIG. 8 can be implemented with several circuit configurations. A first implementation of the circuit configuration is shown in FIG. 9 with the series inductor $L_s$ and the parallel inductor $L_m$ integrated into the transformer 130. FIG. 10 shows an alternate circuit of this invention with full-bridge rectifier, where single winding will be required in the secondary of the transformer. This circuit is adaptable to applications of higher output voltage. FIG. 11 shows another embodiment of a circuit configuration of this invention with full-bridge inverter. This circuit is adaptable to high power applications.

Figure 12:
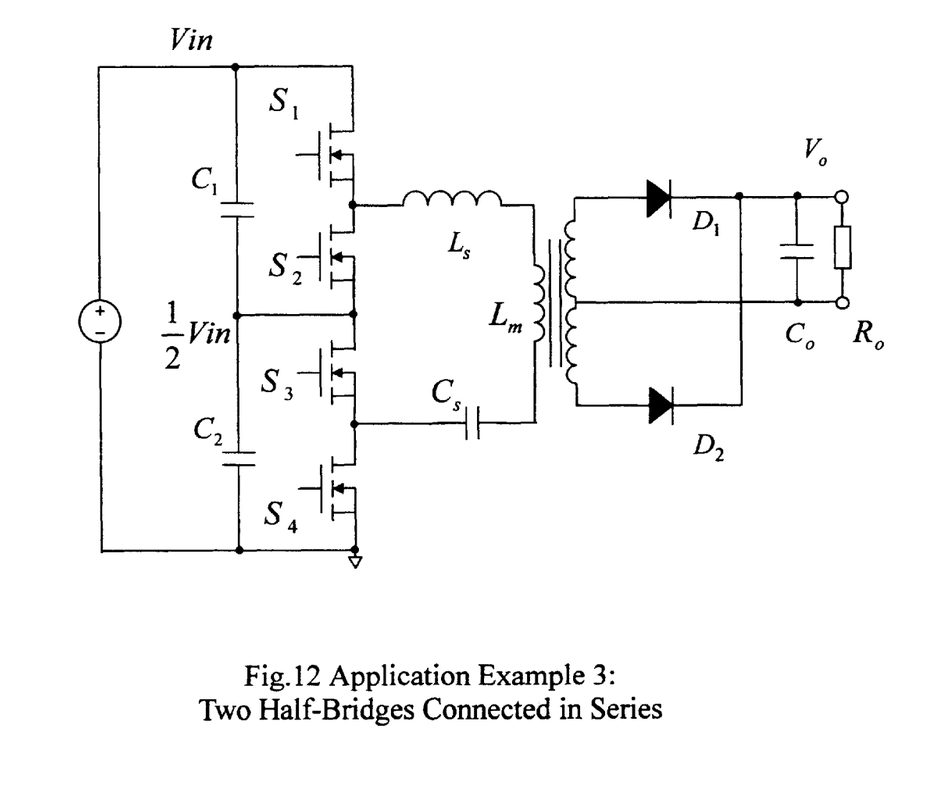
FIG. 12 is a circuit diagram for a converter of this invention with a Two-Half-Bridges Connected in Series.

FIG. 12 shows a different circuit implementation of this invention with two half-bridges in series. This circuit is adaptable to applications of high input voltage and/or high power system.

In essence, this invention discloses an DC-to-DC converter that includes a resonant tank comprising resonant circuits for providing two resonant characteristic frequencies. In a preferred embodiment, the resonant tank comprising a series capacitor connected to a series inductor and a parallel inductor connected in parallel to the load. The series capacitor functioning with the series inductor to provide a first characteristic resonant frequency represented by $f_s$, and the series capacitor functioning with the series inductor and the parallel inductor to provide a second characteristic resonant frequency represented by $f_m$ wherein $f_s > f_m$. In the preferred embodiment, the first characteristic resonant frequency is $f_s = 1/(2\pi\sqrt{L_s C_s})$ and the second characteristic resonant frequency is $f_m = 1/(2\pi\sqrt{(L_s + L_m)C_s})$ wherein $C_s$ representing a capacitance of the series capacitor, $L_s$ representing an inductance of the series inductor and $L_m$ representing an inductance of the parallel inductor. In another preferred embodiment, the magnetizing inductance of the transformer is employed as parallel inductor and an external parallel inductor is not necessary, further more, the leakage inductance of the transformer is used as series inductor and an external series inductance is not necessary.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A DC-to-DC converter comprising:

a square wave generator for generating a sequence of output voltages having a waveform of square wave;

a resonant tank connected to said square wave generator comprising a series capacitor connected to a series inductor and a parallel inductor;

a transformer having a primary side connected in series with said series inductor and connected in parallel to said parallel inductor;

said transformer further including a secondary side for connecting to a rectifying circuit for providing a rectified DC voltage to an output load circuit;

said rectifier circuit further comprising a filtering capacitor for filtering said rectified DC voltage outputted to said output load circuit;

said series capacitor functioning with said series inductor to provide a first characteristic resonant frequency represented by $f_s$, and said series capacitor functioning with said series inductor and said parallel inductor to provide a second characteristic resonant frequency represented by $f_m$ wherein $f_s > f_m$;

said converter operating in the frequency range that is higher than said second frequency $f_m$.

2. The DC-to-DC converter of claim 1 wherein:

when the operation frequency of said DC-to-DC converter is between said first and said second frequency, $f_m < f < f_s$, the switches in said square wave generator operate under zero-voltage-switching condition and the rectifiers in said rectifier circuit operate under zero-current-switching condition.

3. The DC-to-DC converter of claim 1 wherein:

said rectifying circuit comprises a center-tapped rectifying circuit.

4. The DC-to-DC converter of claim 1 wherein:

said rectifying circuit comprises a full-bridge rectifying circuit.

5. The DC-to-DC converter of claim 1 wherein:

said parallel inductor is implemented as an external inductor.

6. The DC-to-DC converter of claim 1 wherein:

said parallel inductor is implemented as a magnetizing inductance of said transformer.

7. The DC-to-DC converter of claim 1 wherein:

said series inductor is implemented as an external inductor.

8. The DC-to-DC converter of claim 1 wherein:

said series inductor is implemented as a leakage inductance of said transformer.

9. The DC-to-DC converter of claim 1 wherein:

said square wave generator comprises a first switch and a second switch complimentary to said first switch for alternately turning on and off for generating said square wave voltage.

10. The DC-to-DC converter of claim 1 wherein:

said square wave generator comprises four switches connected as a full-bridge structure for generating square wave voltage.

11. The DC-to-DC converter of claim 1 wherein:

said square wave generator comprises two half-bridges connected in series for generating square wave voltage.

12. A resonant tank connected to the primary winding of the transformer in a DC-to-DC converter comprising:

a series capacitor connected to a series inductor and a parallel inductor in series;

said parallel inductor connected to the primary winding of the transformer in parallel;

said series capacitor functioning with said series inductor to provide a first characteristic resonant frequency represented by $f_s$, and said series capacitor functioning with said series inductor and said parallel inductor to provide a second characteristic resonant frequency represented by $f_m$ wherein $f_s > f_m$; and said DC-to-DC converter operating in a frequency range higher than said secondary frequency $f_m$.

13. The resonant tank of claim 12 wherein:

said parallel inductor is integrated into the magnetizing inductance of the transformer.

14. The resonant tank of claim 12 wherein:

said series inductor is integrated into the leakage inductance of the transformer.

* * * * *